United States Patent
Park et al.

(10) Patent No.: US 7,035,079 B1
(45) Date of Patent: Apr. 25, 2006

(54) MULTILAYERED CHIP CAPACITOR AND MULTILAYER CHIP CAPACITOR ARRAY

(75) Inventors: Sang Soo Park, Suwon (KR); Dong Seok Park, Seoul (KR); Byoung Hwa Lee, Kyungki-do (KR); Min Cheol Park, Kyungki-do (KR); Hyun Ju Yi, Seoul (KR); Min Kyoung Kwon, Kyungki-do (KR); Hae Suk Chung, Seoul (KR); Chang Hoon Shim, Kyungki-do (KR); Seung Heon Han, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 11/247,404

(22) Filed: Oct. 11, 2005

(30) Foreign Application Priority Data

Dec. 7, 2004 (KR) ........................ 10-2004-102611

(51) Int. Cl.
*H01G 4/005* (2006.01)
*H01G 4/236* (2006.01)
*H01G 4/20* (2006.01)

(52) U.S. Cl. ...................... 361/303; 361/307; 361/320

(58) Field of Classification Search ........ 361/303–305, 361/310–313, 301.5, 306.3, 306.1, 307, 320
See application file for complete search history.

(56) References Cited

U.S. PATENT DOCUMENTS

| 5,880,925 | A | | 3/1999 | DuPré et al. | |
|---|---|---|---|---|---|
| 6,327,134 | B1 | * | 12/2001 | Kuroda et al. | 361/303 |
| 6,366,443 | B1 | * | 4/2002 | Devoe et al. | 361/313 |
| 6,452,781 | B1 | * | 9/2002 | Ahiko et al. | 361/321.2 |
| 6,459,561 | B1 | * | 10/2002 | Galvagni et al. | 361/306.3 |
| 2004/0174656 | A1 | * | 9/2004 | MacNeal et al. | 361/306.3 |

* cited by examiner

*Primary Examiner*—Eric W. Thomas
(74) *Attorney, Agent, or Firm*—Volpe And Koenig,P.C.

(57) ABSTRACT

The present invention provides an MLCC and an MLCC array. The MLCC has desirably low ESL properties by forming the first and second internal electrodes to be spaced apart from each other on the same dielectric layer while overlapping with other first and second internal electrodes on the neighboring dielectric layers, and connecting the first and second internal electrodes to the external terminals provided on the top surface or the bottom surface of the capacitor body through conductive via holes formed in the capacitor body in a stacking direction of the capacitor body.

17 Claims, 13 Drawing Sheets

MULTILAYERED CHIP CAPACITOR AND MULTILAYER CHIP CAPACITOR ARRAY

RELATED APPLICATIONS

The present application is based on, and claims priority from, Korean Application Number 2004-0102611, filed Dec. 7, 2004, the disclosure of which is incorporated by reference herein in its entirety.

BACKGROUND OF THE INVENTION

1. Field of the Invention

The present invention relates, generally, to a multilayered chip capacitor (MLCC), and, more specifically, to an MLCC which reduces equivalent series inductance (ESL), applicable to a decoupling capacitor in a high frequency circuit, and an MLCC array using the MLCC.

2. Description of the Related Art

In general, an MLCC has a structure composed of a plurality of dielectric layers and a plurality of internal electrodes interposed between the dielectric layers. The MLCC, which is advantageous because it has a small size, a high capacitance and easy mountability, is widely applied to various electronic devices. In particular, the MLCC is actively applied to a decoupling capacitor connected between a semiconductor chip and a power source in a power circuit, such as an LSI.

The MLCC for use in decoupling capacitors is required to have lower ESL properties to inhibit a drastic current change and stabilize a power circuit. Such a requirement is further increased depending on recent trends toward electronic devices having high frequency and high current.

To conventionally reduce the ESL, U.S. Pat. No. 5,880,925 discloses a novel arrangement lead structure. In this regard, an MLCC composed of alternately arranged leads adjacent to first and second internal electrodes having the opposite polarities is shown in FIGS. 1a and 1b.

Figure 1A:
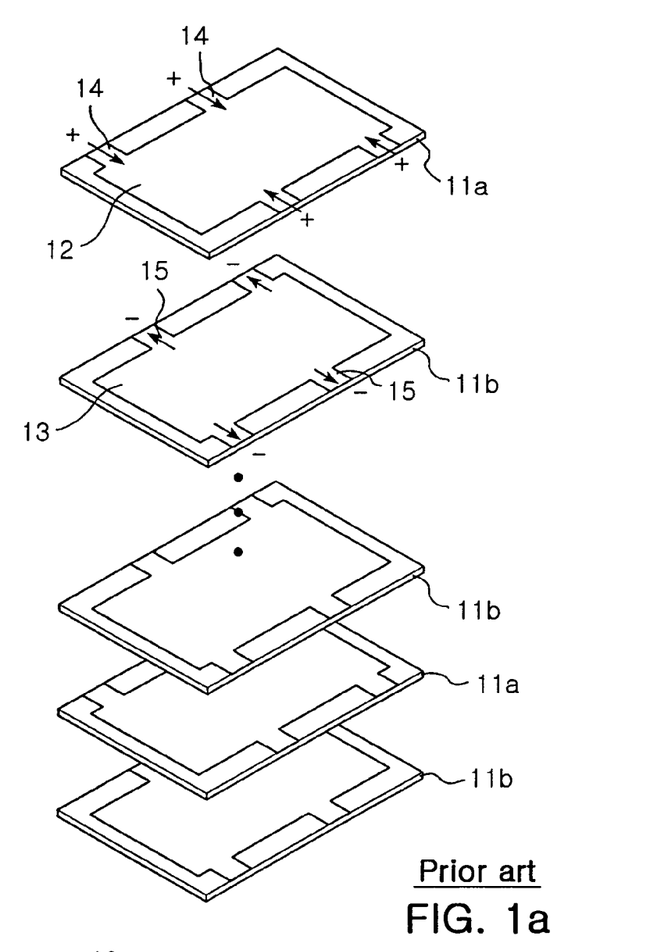
FIGS. 1a and 1b are an exploded perspective view and a schematic perspective view, respectively, showing a conventional MLCC.

As shown in FIG. 1a, a conventional MLCC 10 includes a plurality of dielectric layers 11a and 11b which are alternately positioned, and pluralities of first and second internal electrodes 12 and 13 formed on the dielectric layers 11a and 11b, respectively. Two opposite sides of each of the first and second internal electrodes 12 and 13 are provided with two leads 14 and 15.

Figure 1B:
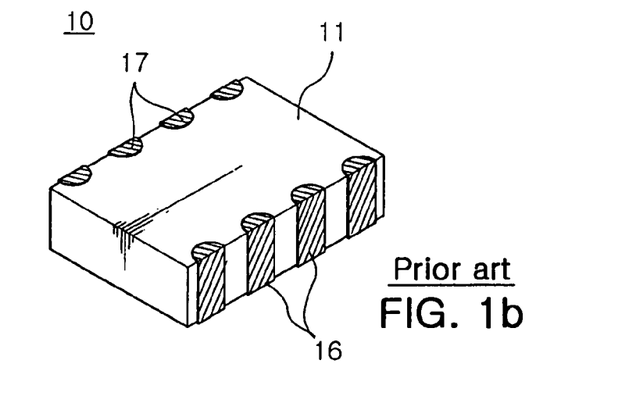

The dielectric layers 11a and 11b on which the internal electrodes 12 and 13 are respectively formed as shown in FIG. 1a are stacked to constitute a capacitor body 11 of FIG. 1b. In addition, external terminals 16 and 17, which are connected to the leads 14 and 15, are formed, thus obtaining an MLCC 10.

Since the leads 14 of the first internal electrode 12 and the leads 15 of the second internal electrode 13 are alternately disposed, currents of the internal electrodes 12 and 13 flow in opposite directions, as represented by arrows in FIG. 1a. Hence, parasitic inductance generated from the internal electrode 12 or 13 is partially offset by parasitic inductance generated from the adjacent internal electrode 13 or 12, thus realizing low ESL properties.

However, the conventional MLCC has had the goal of only offsetting the current flow in the internal electrodes. That is, only methods of reducing the ESL by changing the leads of the internal electrodes or the internal electrode structure have been employed. Moreover, in order to achieve desirably low ESL properties, attempts to change the entire structure of the MLCC have not been made yet.

Further, in recent years, as electronic components have been manufactured to be miniaturized, a capacitor array, which is composed of two or more capacitors having the same or different capacitances, formed into a single chip, is increasingly required. However, conventional methods using the plurality of leads are considered inappropriate, due to limited mounting space in the array.

Figure 2A:
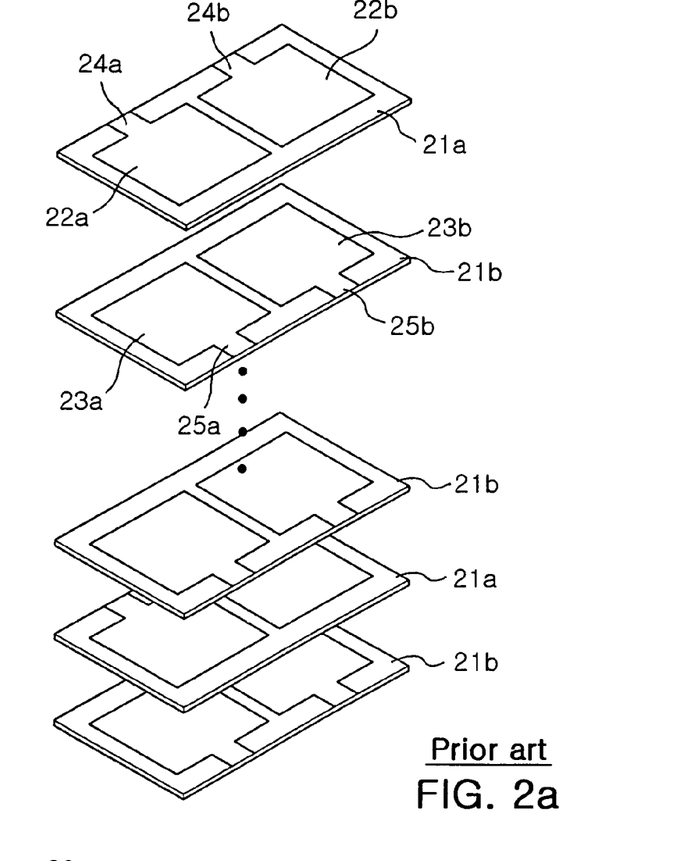
FIGS. 2a and 2b are an exploded perspective view and a schematic perspective view, respectively, showing another conventional MLCC.
Figure 2B:
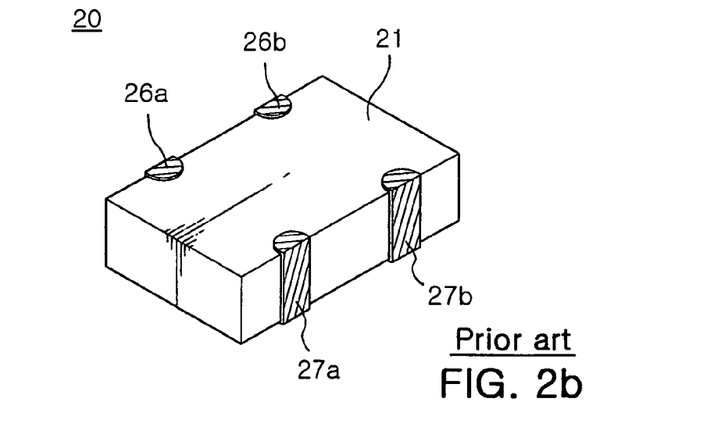

FIGS. 2a and 2b show a conventional MLCC array.

As shown in FIG. 2a, the conventional MLCC array includes a plurality of dielectric layers 21a and 21b, and two first internal electrodes 22a and 22b provided on the dielectric layers 21a and two second internal electrodes 23a and 23b on the dielectric layers 21b. Each of the first and second internal electrodes 22a, 22b, 23a and 23b has a lead 24a, 24b, 25a and 25b protruding from one side thereof. The dielectric layers 21a and 21b, on which the first and second internal electrodes 22a and 22b, and 23a and 23b are formed as in FIG. 2a, are stacked to form a capacitor body 21 as shown in FIG. 2b. Also, external terminals 26a, 26b, 27a and 27b, which are connected to the leads 24a, 24b, 25a and 25b, are formed, thus completing an MLCC array 20.

In such a structure, the first and second internal electrodes 22a and 23a formed on regions of the dielectric layers 21a and 21b and the first and second internal electrodes 22b and 23b of the other regions thereof function as separate capacitor electrodes.

However, as seen in FIGS. 2a and 2b, the conventional MLCC array 20 is disadvantageous because each capacitor part is horizontally arranged, and hence, the array 20 is difficult to miniaturize when three or more capacitors are used.

Required to manufacture the MLCC array having low ESL properties for application in a decoupling capacitor, the lead structure for realizing low ESL properties is disclosed in U.S. Pat. No. 5,880,925, but it is difficult to use, due to the limited outer area for accommodating the lead structure. That is, in the case where the number of leads doubles at one side of a single internal electrode in the MLCC array shown in FIG. 2a, the number of leads increases by two times the number of capacitors. Thus, it is difficult to form the increased number of leads in a limited outer area.

Therefore, there is required a novel MLCC which can effectively achieve the low ESL properties by changing the structure of the MLCC itself, and also, can be appropriately applied to an MLCC array.

SUMMARY OF THE INVENTION

Therefore, the present invention has been made keeping in mind the above problems occurring in the related art, and an object of the present invention is to provide an MLCC having low ESL properties, by forming first and second internal electrodes that are spaced apart from each other on the same dielectric layer while they overlap with other first and second internal electrodes on the neighboring dielectric layer, and connecting the first and second internal electrodes to external terminals provided on a top surface or a bottom surface of a capacitor body through conductive via holes formed in the capacitor body in a stacking direction of the capacitor body.

Another object of the present invention is to provide an MLCC array having a plurality of capacitor parts, in which the above MLCC is used as at least one capacitor part.

In order to accomplish the above objects, the present invention provides an MLCC, which comprises a capacitor body formed by stacking a plurality of dielectric layers pluralities of first and second internal electrodes formed on each of the dielectric layers, at least one first external terminal and at least one second external terminal formed on at least one of a top surface and a bottom surface of the capacitor body, and at least one first conductive via hole and at least one second conductive via hole formed in the capacitor body in a stacking direction of the capacitor body to be connected to the first and second external terminals, wherein the first and second internal electrodes formed on the same dielectric layer are spaced apart from each other, and the first and second internal electrodes formed on the stacked dielectric layers overlap with each other with one dielectric layer interposed therebetween, each of the first and second internal electrodes having at least one lead-out portion at positions where the first and second internal electrodes overlap with other first and second internal electrodes formed on a vertically adjacent dielectric layer, the at least one first conductive via hole is formed through the lead-out portions of the first internal electrodes while being electrically insulated from the second internal electrodes, and the at least one second conductive via hole is formed through the lead-out portions of the second internal electrodes while being electrically insulated from the first internal electrodes.

According to a first embodiment of the present invention, each of the dielectric layers includes one first internal electrode and one second internal electrode thereon, and the at least one lead-out portion of each of the first and second internal electrodes protrudes toward the adjacent second and first internal electrodes on the same dielectric layer, and each of the first and second internal electrodes has a recess, which allows the first and second internal electrodes to be spaced apart from the adjacent second and first internal electrodes on the same dielectric layer.

According to a second embodiment of the present invention, each of the dielectric layers has a plurality of first internal electrodes or a plurality of second internal electrodes, or a plurality of first internal electrodes and a plurality of second internal electrodes thereon, and the first and second internal electrodes are alternately disposed on the same dielectric layer. Preferably, the pluralities of first and second internal electrodes are alternately disposed in one direction.

Preferably, the at least one lead-out portion is formed at at least one side of the first and second internal electrodes, and each of the first and second internal electrodes has at least one recess at the other side thereof opposite the at least one lead-out portion thereof.

As such, for simpler external terminal arrangement, the first and second internal electrodes formed on the same dielectric layer have the same pattern shape.

Further, each of the first and second internal electrodes has at least one lead-out portion and at least one recess at a side thereof opposite the adjacent second and first internal electrodes on the same dielectric layer. As such, the at least one lead-out portion and the at least one recess formed at the side of each of the first and second internal electrodes are alternately disposed.

In addition, the present invention provides an MLCC array composed of the MLCC, which comprises a capacitor body formed by stacking a plurality of dielectric layers, and a plurality of capacitor parts formed at a plurality of divided regions on each of the dielectric layers, wherein each of the capacitor parts includes pluralities of first and second internal electrodes formed on one region of each of the dielectric layers, at least one first external terminal and at least one second external terminal formed on at least one of a top surface and a bottom surface of the capacitor body, and at least one first conductive via hole and at least one second conductive via hole formed in the capacitor body in a stacking direction of the capacitor body to be connected to the first and second external terminals, the first and second internal electrodes formed on the same dielectric layer are spaced apart from each other, and the first and second internal electrodes formed on the stacked dielectric layers overlap with each other with one dielectric layer interposed therebetween, each of the first and second internal electrodes having at least one lead-out portion at positions where the first and second internal electrodes overlap with other first and second internal electrodes formed on a vertically adjacent dielectric layer, and the at least one first conductive via hole is formed through the lead-out portions of the first internal electrodes while being electrically insulated from the second internal electrodes, and the at least one second conductive via hole is formed through the lead-out portions of the second internal electrodes while being electrically insulated from the first internal electrodes.

BRIEF DESCRIPTION OF THE DRAWINGS

The above and other objects, features and advantages of the present invention will be more clearly understood from the following detailed description taken in conjunction with the accompanying drawings, in which:

FIG. 3c is a schematic view showing the low ESL properties in the MLCC of FIG. 3a;

FIGS. 4b and 4c are side sectional views taken along the lines A—A and B—B, respectively, of the MLCC of FIG. 4a;

FIGS. 5b and 5c are side sectional views taken along the lines A—A and B—B, respectively, of the MLCC of FIG. 5a;

DESCRIPTION OF THE PREFERRED EMBODIMENTS

Hereinafter, a detailed description will be given of various embodiments of the present invention, with reference to the appended drawings.

Figure 3A:
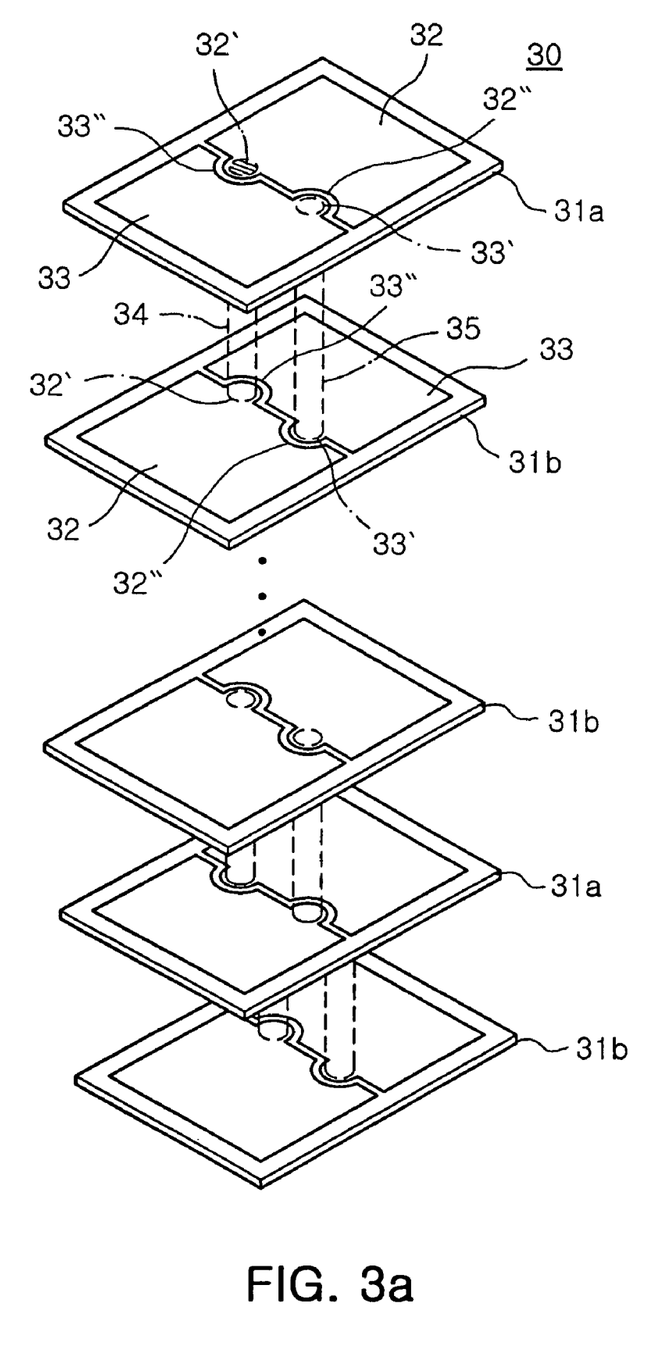
FIGS. 3a and 3b are an exploded perspective view and a schematic perspective view, respectively, showing an MLCC according to a first embodiment of the present invention.
Figure 3B:
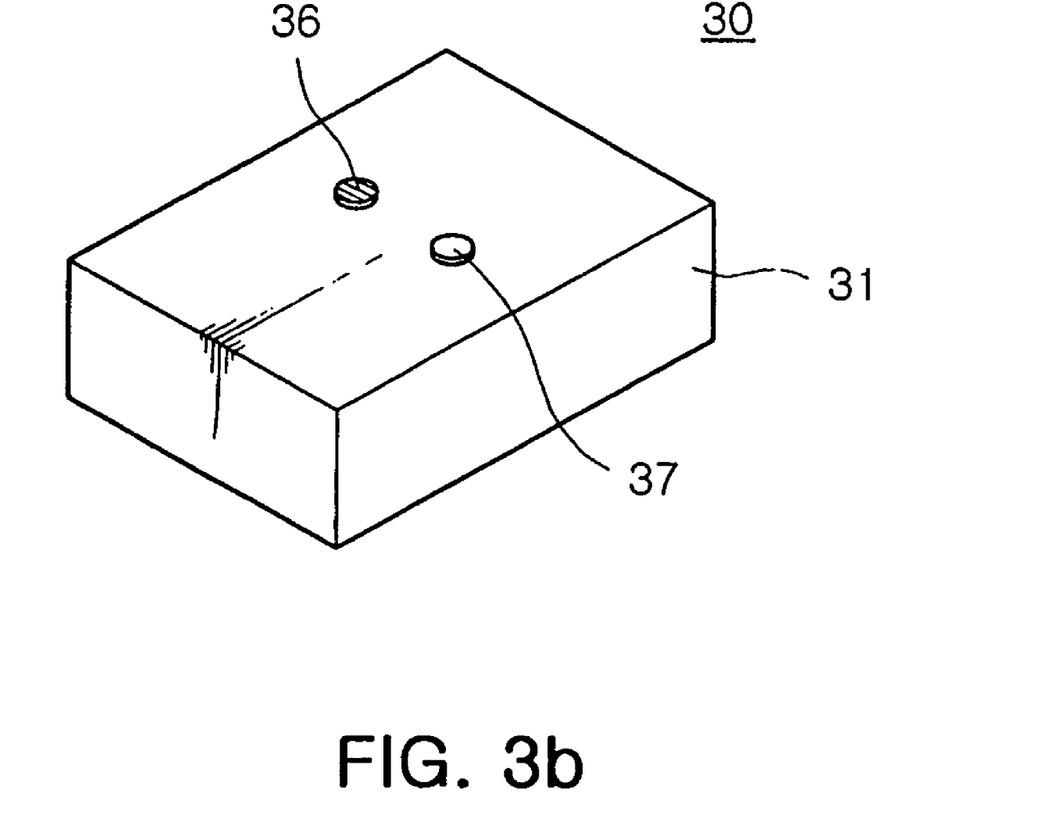

FIGS. 3a and 3b are an exploded perspective view and a schematic perspective view, respectively, showing an MLCC according to a first embodiment of the present invention.

As shown in FIGS. 3a and 3b, the MLCC 30 includes a plurality of dielectric layers 31a and 31b constituting a capacitor body, and pluralities of first and second internal electrodes 32 and 33 formed on each of the dielectric layers 31a and 31b. The first internal electrode 32 and the second internal electrode 33 are formed together on one dielectric layer 31a or 31b in such a way that they are spaced at a predetermined interval from each other. In addition, the first or second internal electrodes 32 or 33 overlap with each other with the dielectric layers 31a or 31b interposed therebetween. That is, the first and second internal electrodes 32 and 33 formed on one dielectric layer 31a or 31b are disposed to overlap with the second and first internal electrodes 33 and 32 formed on the neighboring dielectric layer 31b or 31a.

Further, the first and second internal electrodes 32 and 33 have protruded lead-out portions 32' and 33', respectively. The lead-out portions 32' and 33' of the internal electrodes 32 and 33 are formed such that lead-out portions 32' or 33' having one polarity on the dielectric layers 31a and 31b overlap with each other but do not overlap lead-out portions 33' or 32' having the other opposite polarity. To effectively realize such an arrangement, the first and second internal electrodes 32 and 33 preferably have recesses 32" and 33", which allow the first and second internal electrodes 32 and 33 to be spaced apart from the adjacent second and first internal electrodes 33 and 32 on the same dielectric layers 31a and 31b.

Further, the lead-out portions 32' and 33' of the internal electrodes 32 and 33 protrude toward the adjacent internal electrodes 33 and 32 on the same dielectric layers 31a and 31b. Through the lead-out portions 32' and 33', first and second conductive via holes 34 and 35 are formed to connect the sets of first and second internal electrodes 32 and 33 themselves formed on the dielectric layers 31a and 31b. Specifically, the first conductive via hole 34 connects the set of first internal electrodes 32 on the dielectric layers 31a and 31b to each other while being electrically insulated from the set of second internal electrodes 33. Also, the second conductive via hole 35 connects the set of second internal electrodes 33 on the dielectric layers 31a and 31b to each other while being electrically insulated from the set of first internal electrodes 32.

The lead-out portions 32' and 33' are provided, along with the recesses 32" and 33", to effectively connect the set of internal electrodes 32 having one polarity to each other and connect the set of internal electrodes 33 having the other polarity to each other, through the first and second conductive via holes 34 and 35.

In this way, the first and second internal electrodes 32 and 33 coexist on the same dielectric layers 31a and 31b while being disposed to alternate on the neighboring dielectric layers 31b and 31a. The sets of first and second internal electrodes 32 and 33, which are alternately disposed, are connected such that the set of first internal electrodes 32 having one polarity are connected to each other and the set of second internal electrodes 33 having the other polarity are connected to each other, through the first and second conductive via holes 34 and 35. Thereby, a plurality of unit capacitors (capacitance components defined by first and second internal electrodes 32 and 33) is connected in parallel to be operated as one capacitor, to obtain an MLCC 30.

FIG. 3b is an external perspective view showing the MLCC 30 completed by stacking the dielectric layers 31a and 31b shown in FIG. 3a.

As shown in FIG. 3b, together with FIG. 3a, first and second external terminals 36 and 37, which are connected to the first and second conductive via holes 34 and 35, are formed on a top surface of a capacitor body 31 obtained by stacking the plurality of dielectric layers 31a and 31b. Although the bottom surface of the capacitor body 31 is not shown as in FIG. 2b, the first and second external terminals 36 and 37 may be formed to be connected to the first and second conductive via holes 34 and 35 even on the bottom surface of the capacitor body 31 like the top surface thereof.

Figure 3C:
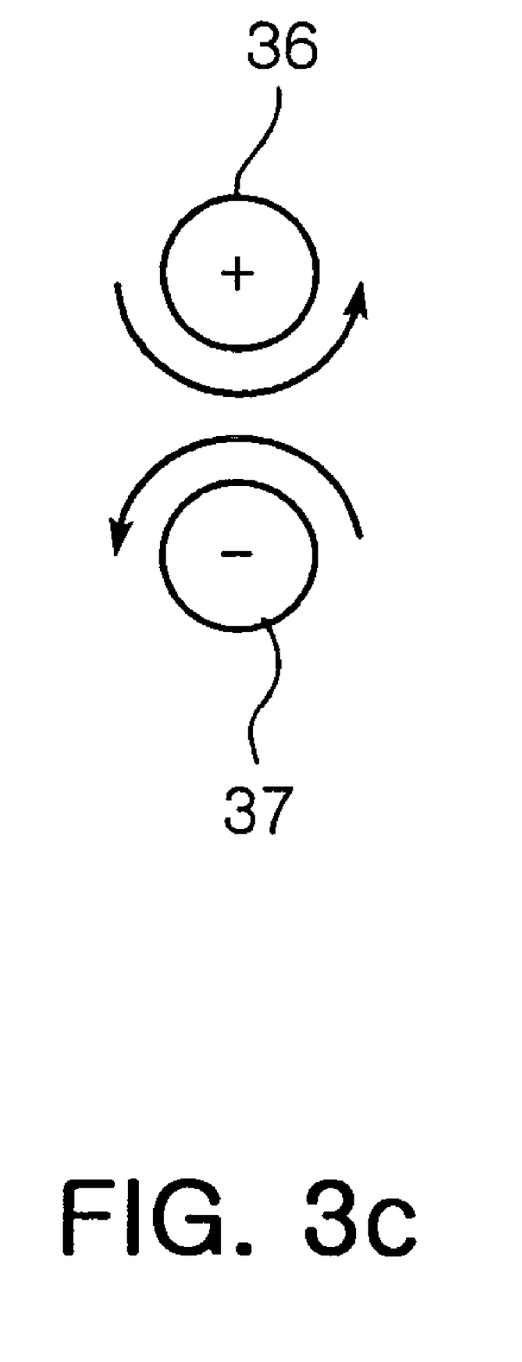

FIG. 3c is a schematic view explaining the low ESL properties in the MLCC 30 shown in FIG. 3a.

In the MLCC 30, when voltage is applied to the first external terminal 36 and the second external terminal 37, the first conductive via hole 34 connected to the first external terminal 36 and the second conductive via hole 35 connected to the second external terminal 37, adjacent to the first conductive via hole 34, create opposite magnetic fluxes, which are then offset. Further, the MLCC 30, according the first embodiment of the present invention, has shorter current paths, thus exhibiting desirably low ESL, compared to conventional MLCCs having terminals connected to both ends of the electrodes.

In the present embodiment, the MLCC 30 comprising the dielectric layers 31a and 31b, each of which has one first internal electrode 32 and one second internal electrode 33 thereon, is illustrated. Alternatively, at least one of the first and second electrodes on the same dielectric layer is provided in a plural number, that is, a plurality of first internal electrodes or a plurality of second internal electrodes, or a plurality of first internal electrodes and a plurality of second internal electrodes are formed thereon, in which the internal electrodes may be alternately arranged thereon. As such, to simplify the internal electrode structure, it is preferable that the internal electrodes be arranged in one direction, which is shown in FIGS. 4a to 4c.

Figure 4A:
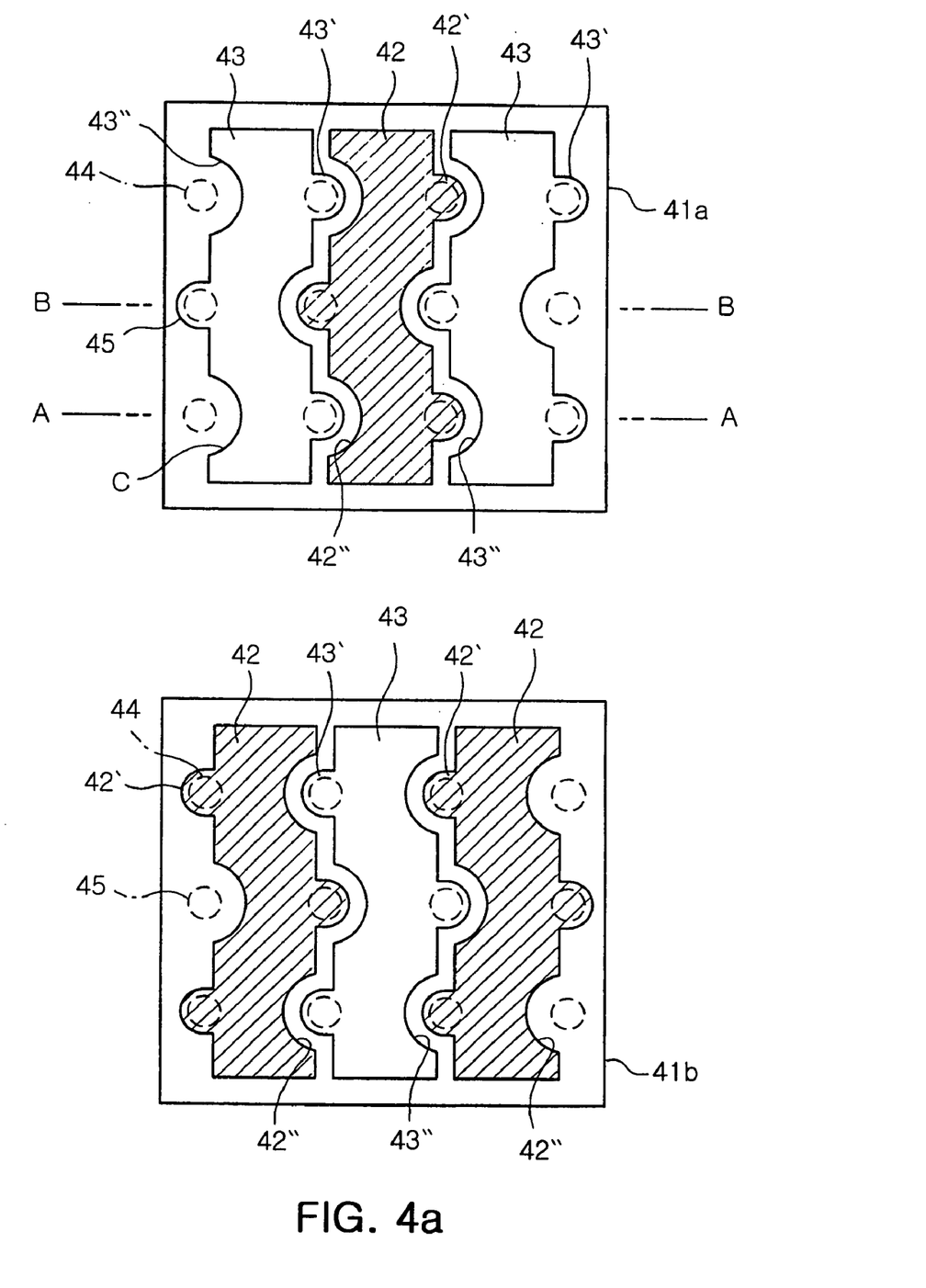
FIG. 4a is a top plan view showing an internal electrode structure and an arrangement of conductive via holes in an MLCC according to a second embodiment of the present invention.
Figure 4B:
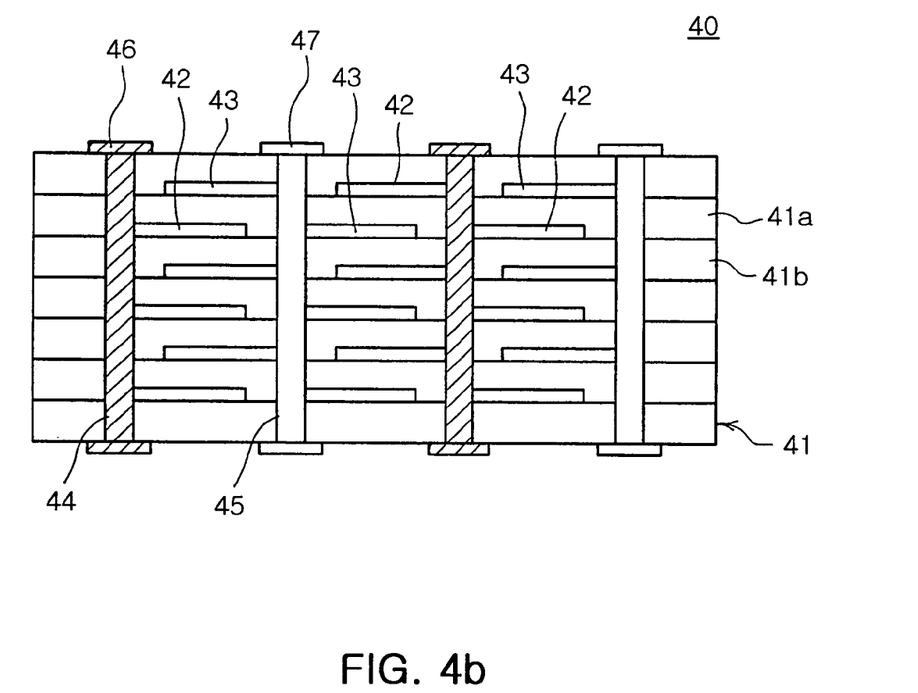
Figure 4C:
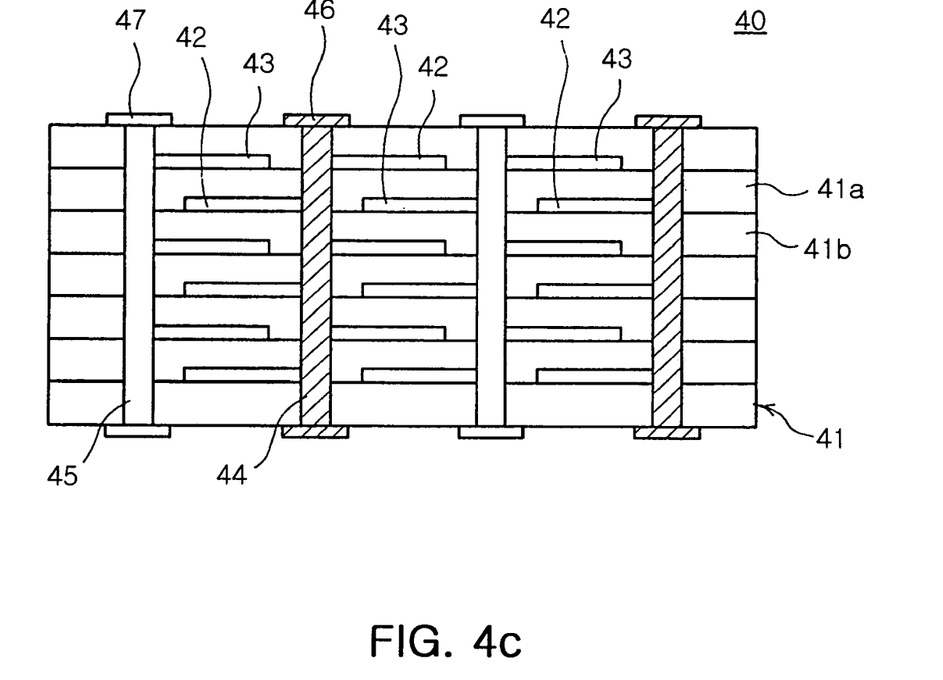

FIG. 4a is a top plan view showing the arrangement structure of first and second internal electrodes 42 and 43 on each of first and second dielectric layers 41a and 41b, in an MCLL according to a second embodiment of the present invention. In the drawing, it is understood that pluralities of first and second dielectric layers 41a and 41b are alternately stacked to constitute a capacitor body 41 of the MLCC (FIG. 4b or 4c).

As shown in FIG. 4a, one first internal electrode 42 and two second internal electrodes 43 are alternately arranged on the first dielectric layer 41a. In addition, on the second dielectric layer 41b neighboring the first dielectric layer 41a, two first internal electrodes 42 and one second internal electrode 43 are alternately arranged.

The first and second internal electrodes 42 and 43 on the first dielectric layer 41a overlap with the second and first internal electrodes 43 and 42 formed on the second dielectric layer 41b.

In the present embodiment, the first and second internal electrodes 42 and 43 are configured to have the same shape, such that each of the first and second internal electrodes 42 and 43 is provided at one side thereof with two lead-out portions 42' or 43' and one recess 42" or 43", which are alternately disposed, and at the other side thereof with one lead-out portion 42' or 43' and two recesses 42" or 43", which are alternately disposed.

Each set of lead-out portions 42' or 43' is formed at positions where the set of internal electrodes 42 or 43, which are alternately provided on the neighboring dielectric layers 41b and 41a and have the same polarity, overlaps to be connected to each other. The recesses 42" or 43" of the internal electrodes 42 or 43, which are formed at the other side of the internal electrodes 42 or 43 opposite the lead-out portions 42' or 43', are formed at positions overlapping with the lead-out portions 43' or 42' of the adjacent internal electrodes 43 or 42, so that the internal electrodes 42 and 43 are not connected to the internal electrodes 43 and 42 provided on the vertically adjacent dielectric layers 41a and 41b and having the opposite polarity.

The recesses 42" and 43" of the internal electrodes 42 and 43 allow the internal electrodes 42 and 43 to be spaced at predetermined intervals apart from the lead-out portions 43' and 42' of the adjacent internal electrodes 43 and 42, and also, function to prevent the conductive via holes 45 and 44 from being undesirably connected between the internal electrodes 42 and 43 having the opposite polarities. As such, the conductive via holes are formed at the portions indicated by 44 and 45, and their structures are shown in FIGS. 4b and 4c.

FIGS. 4b and 4c are side sectional views taken along the lines A—A and B—B, respectively, in the MLCC 40 manufactured by stacking the dielectric layers 41a and 41b of FIG. 4a, according to the second embodiment of the present invention.

As shown in FIGS. 4b and 4c, the sets of the first and second internal electrodes 42 and 43 formed on the dielectric layers 41a and 41b are connected to themselves respectively through the first and second conductive via holes 44 and 45. The first and second conductive via holes 44 and 45 are connected to the first and second external terminals 46 and 47, respectively, which are provided on the top and bottom surfaces of the capacitor body 41. When power is supplied to the capacitor body 41 through the first and second external terminals 46 and 47, capacitance is generated between the first and second internal electrodes 42 and 43 formed on the stacked dielectric layers 41a and 41b by means of the first and second conductive via holes 44 and 45. At this time, unit capacitors which generate capacitance are connected in parallel, and hence, acts as one capacitor.

Further, when the MLCC 40 is operated, opposite magnetic fluxes are created from the adjacent first and second conductive via holes 44 and 45 as in FIG. 3c, and then offset, thus manifesting the low ESL.

Figure 5A:
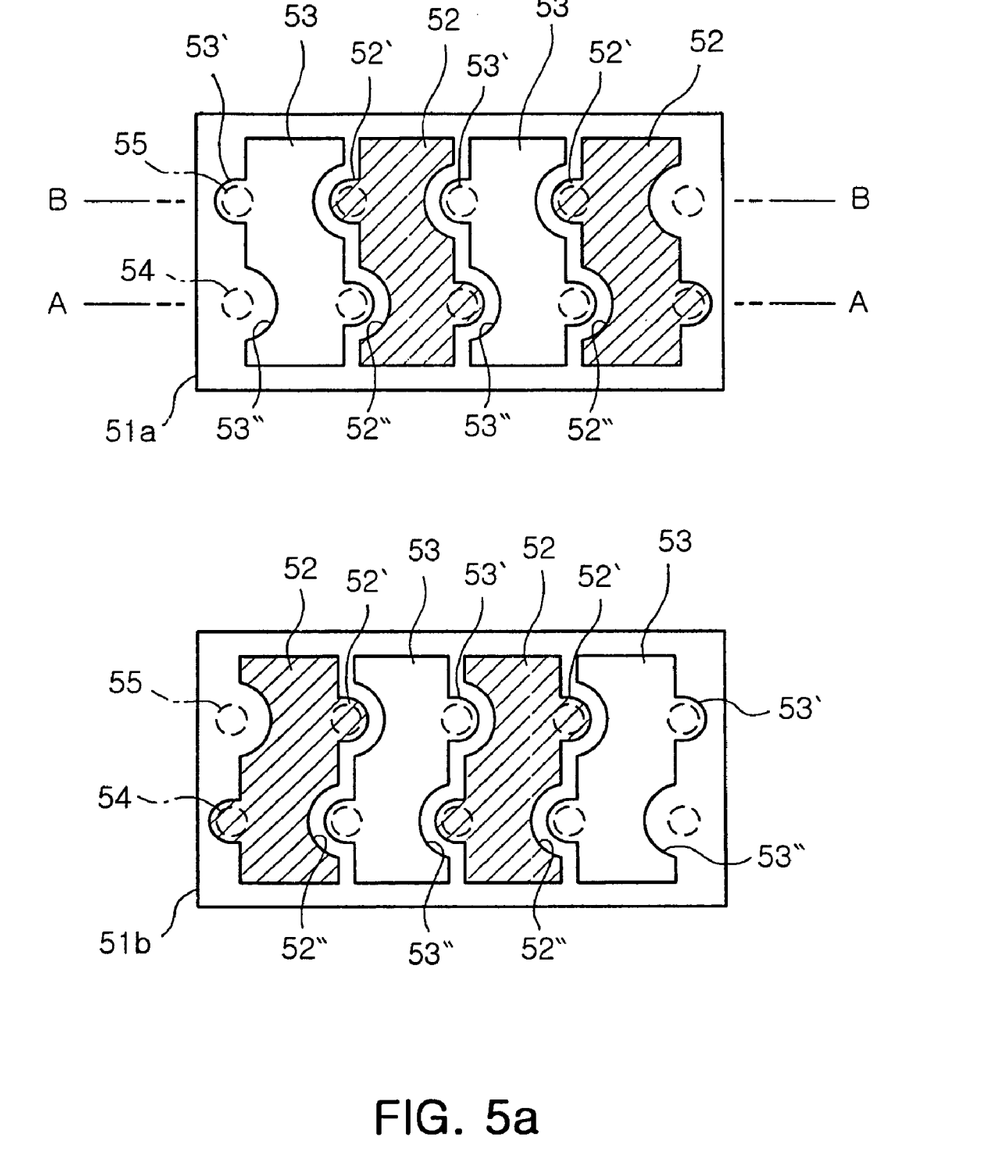
FIG. 5a is a top plan view showing an internal electrode structure and an arrangement of conductive via holes, in an MLCC according to a third embodiment of the present invention.
Figure 5B:
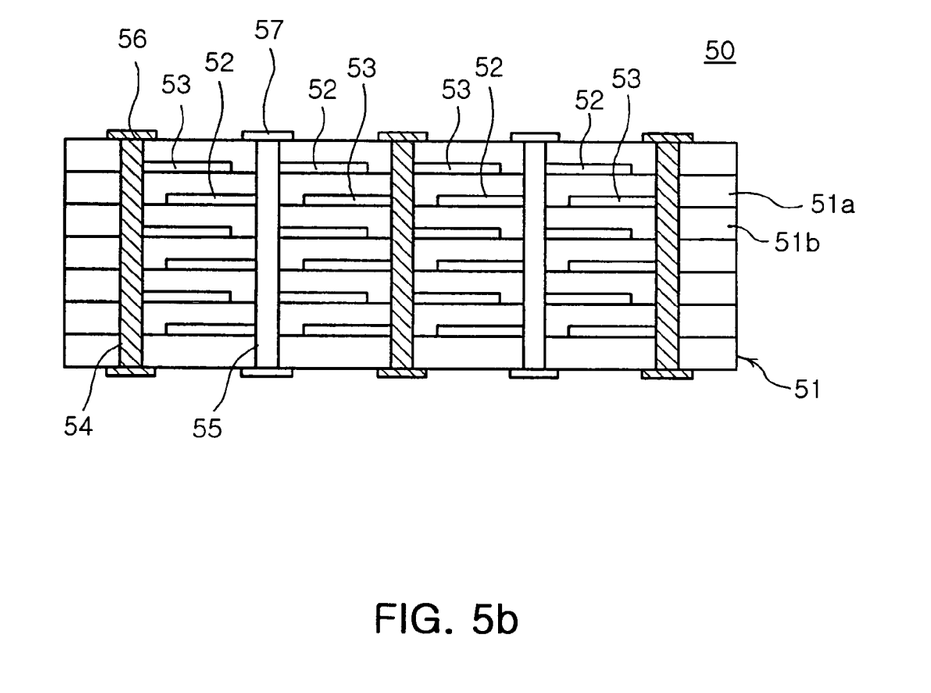
Figure 5C:
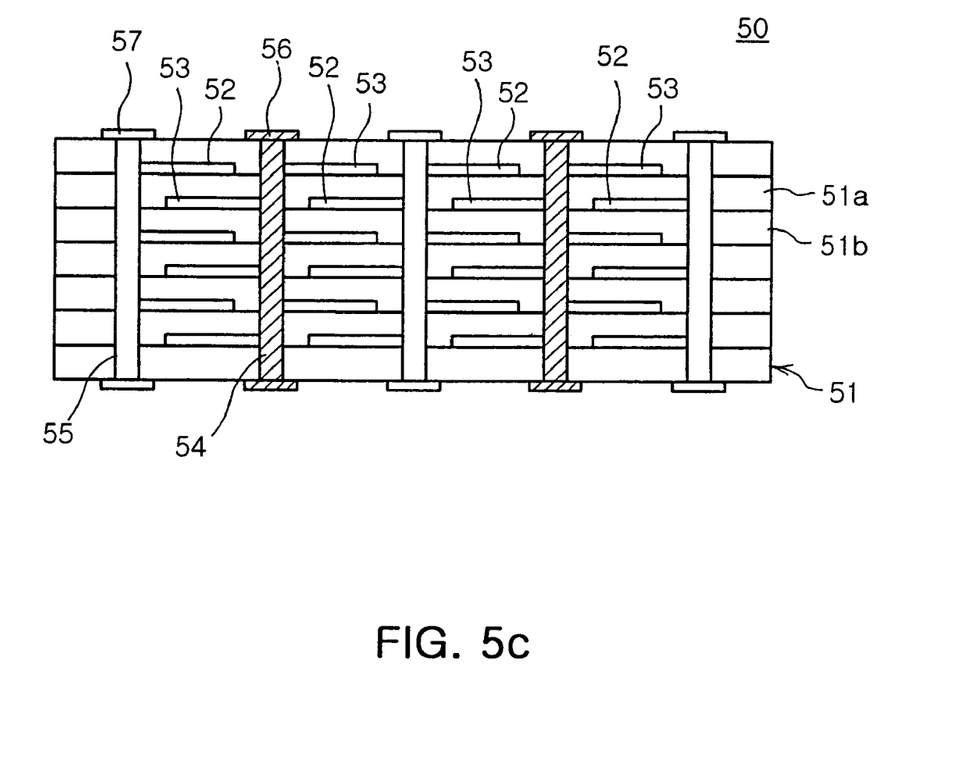

Moreover, in the MLCC, the number of internal electrodes and the shape of the internal electrode pattern may be variously changed. FIGS. 5a to 5c show an internal electrode structure and an arrangement of conductive via holes in an MLCC according to a third embodiment of the present invention.

As is apparent from FIG. 5a, two first internal electrodes 52 and two second internal electrodes 53 are alternately arranged in one direction on a first dielectric layer 51a. Further, two first internal electrodes 52 and two second internal electrodes 53 are alternately arranged in one direction on a second dielectric layer 51b neighboring the first dielectric layer 51a.

The first and second internal electrodes 52 and 53 formed on the first dielectric layers 51a overlap with the second and first internal electrodes 53 and 52 formed on the second dielectric layers 51b.

In the present embodiment, the first and second internal electrodes 52 and 53 are configured to have the same shape, such that each of the first and second internal electrodes 52 and 53 is provided at one side thereof with one lead-out portion 52' or 53' and one recess 52" or 53", which are alternately disposed, and at the other side thereof with one lead-out portion 52' or 53' and one recess 52" or 53", which are alternately disposed.

Like the structure shown in FIG. 4a, each set of lead-out portions 52' or 53' is formed at positions where the set of internal electrodes 52 or 53, which are alternately provided on the neighboring dielectric layers 51b and 51a and have the same polarity, overlap to be connected to each other. The recesses 52" or 53" of the internal electrodes 52 or 53, which are formed at the other side of the internal electrodes 52 or 53 opposite the lead-out portions 52' or 53', are formed at positions overlapping with the lead-out portions 53' or 52' of the adjacent internal electrodes 53 or 52, so that the internal electrodes 52 and 53 are not connected to the internal electrodes 53 and 52 provided on the vertically adjacent dielectric layers 51a and 51b and having the opposite polarity.

FIGS. 5b and 5c are side sectional views taken along the lines A—A and B—B, respectively, in the MLCC 50 manufactured by stacking the dielectric layers 51a and 51b of FIG. 5a, according to the third embodiment of the present invention.

As shown in FIGS. 5b and 5c, the sets of first and second internal electrodes 52 and 53 formed on the dielectric layers 51a and 51b are connected to themselves respectively through the first and second conductive via holes 54 and 55. The first and second conductive via holes 54 and 55 are connected to first and second external terminals 56 and 57 on top and bottom surfaces of a capacitor body 51. When power is supplied to the capacitor body 51 through the first and second external terminals 56 and 57, capacitance is generated between the first and second internal electrodes 52 and 53 formed on the stacked dielectric layers 51a and 51b by means of the first and second conductive via holes 54 and 55. At this time, respective unit capacitors, which generate capacitance, are connected in parallel, and hence, acts as one capacitor.

In addition, the MLCC mentioned above is applied to a single chip type of capacitor array.

Figure 6:
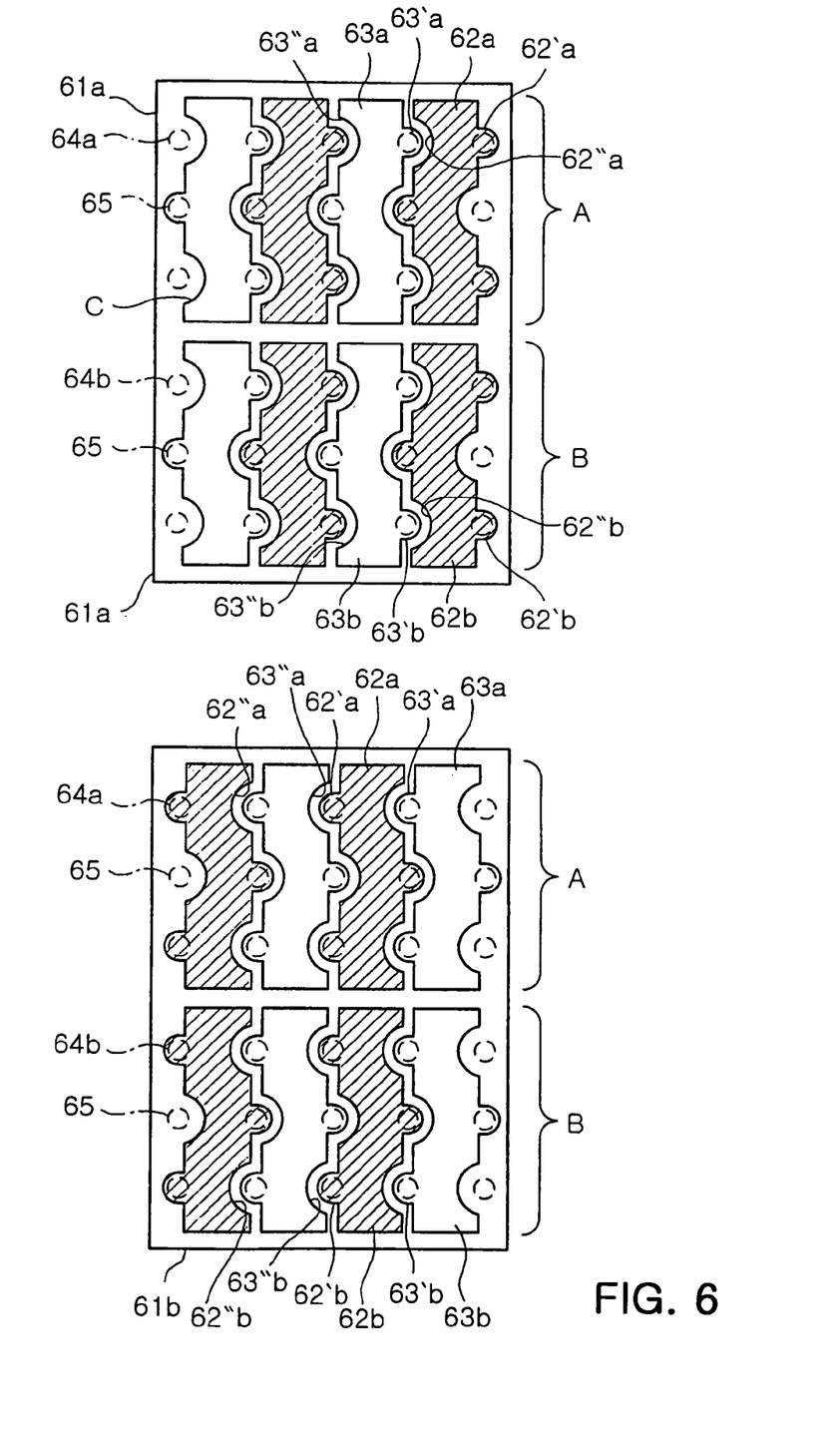
FIG. 6 is a top plan view showing an internal electrode structure in an MLCC array according to a first embodiment of the present invention.

Turning now to FIG. 6, there is shown an internal electrode structure in an MLCC array according to a first embodiment of the present invention. Pluralities of first and second dielectric layers 61a and 61b shown in FIG. 6 are alternately stacked to constitute a capacitor body.

In FIG. 6, the first and second dielectric layers 61a and 61b, each of which is divided into regions A and B, are depicted. In each region, first and second internal electrodes 62a and 62b, and 63a and 63b are formed in the same arrangement. That is, two first internal electrodes 62a and 62b and two second internal electrodes 63a and 63b are alternately arranged over the regions A and B of the first dielectric layer 61a. In addition, two first internal electrodes 62a and 62b and two second internal electrodes 63a and 63b are alternately arranged over the regions A and B of the second dielectric layer 61b, neighboring the first dielectric layer 61a.

Like the pattern of the internal electrodes 42 and 43 shown in FIG. 4a, each of the first and second internal electrodes 62a and 62b, and 63a and 63b is provided at one side thereof with two lead-out portions 62'a, 62'b, 63'a or 63'b and one recess 62"a, 62"b, 63"a or 63"b, which are alternately disposed, and at the other side thereof with one lead-out portion 62'a, 62'b, 63'a or 63'b and two recesses 62"a, 62"b, 63"a or 63"b, which are alternately disposed.

In the first and second internal electrodes 62a and 62b, and 63a and 63b of the regions A and B, first and second conductive via holes 64a, 64b and 65 are formed through the lead-out portions 62'a, 62'b, 63'a and 63'b, to connect the set of internal electrodes 62a, 62b, 63a or 63b having one polarity to each other.

As such, the sets of first and second internal electrodes 62a and 63a formed at the regions A of the first and second dielectric layers 61a and 61b are connected to themselves through the first and second conductive via holes 64a and 65, and thus, act as one capacitor. Further, the sets of first and second internal electrodes 62b and 63b formed at the regions B of the first and second dielectric layers 61a and 61b are connected to themselves through the first and second conductive via holes 64b and 65, and thus act as one capacitor.

In the present embodiment, although the MLCC array having two capacitor parts is illustrated, it is possible to divide the region of the dielectric layer into three or more to form additional capacitor parts. In addition, the first and second internal electrodes constituting the two capacitor parts are arranged in parallel, and thus, two capacitors are longitudinally disposed. However, the two capacitors may be transversely disposed by removing the lead-out portions formed between the first internal electrode and the second internal electrode disposed centrally in FIG. 6 and not forming the conductive via holes.

Further, the MLCC array shown in FIG. 6 includes two capacitor parts having the same capacitance value. However, the parts of the MLCC array may have different capacitance values, as in FIG. 7.

Figure 7:
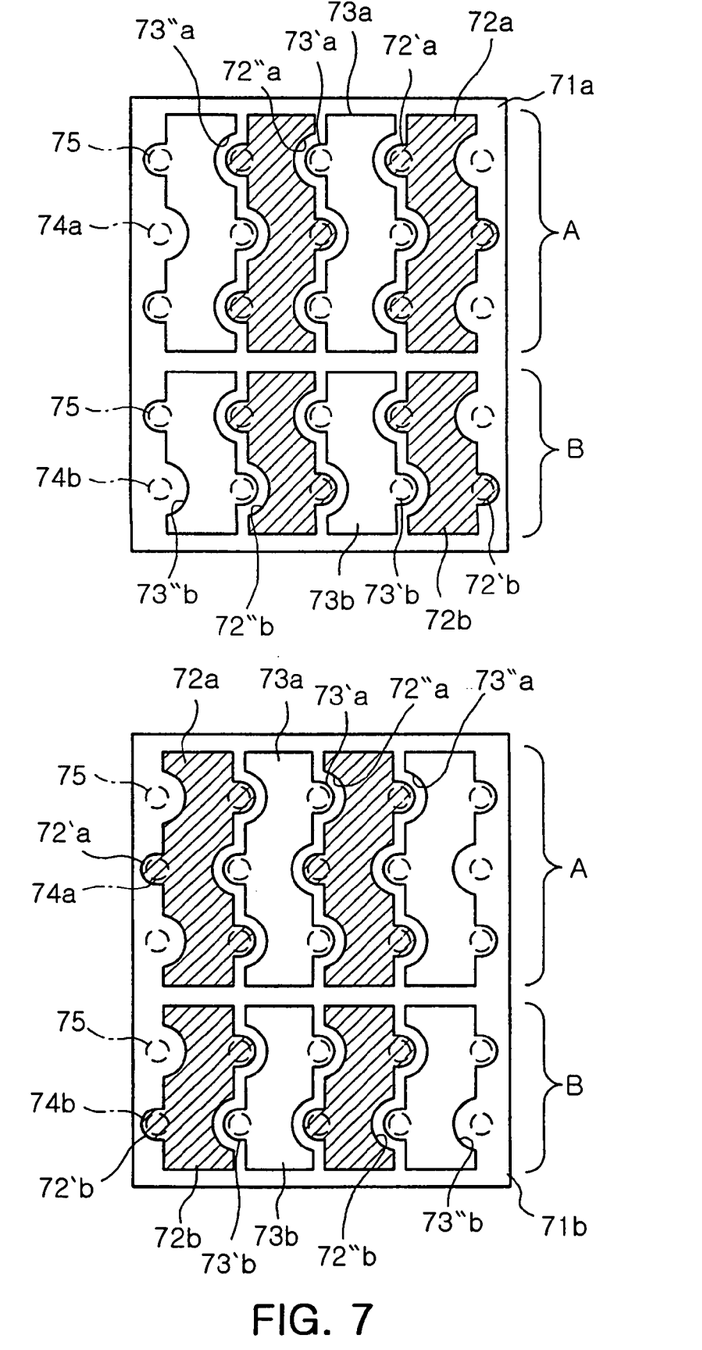
FIG. 7 is a top plan view showing an internal electrode structure in an MLCC array according to a second embodiment of the present invention.

FIG. 7 shows an internal electrode structure of an MLCC array having two capacitor parts which are different in capacitance, according to a second embodiment of the present invention.

As seen in FIG. 7, first and second dielectric layers 71a and 71b, each of which is divided into regions A and B, are depicted, like the structure shown in FIG. 6. That is, two first internal electrodes 72a and 72b and two second internal electrodes 73a and 73b are alternately arranged over the regions A and B of the first dielectric layer 71a. In addition, two first internal electrodes 72a and 72b and two second internal electrodes 73a and 73b are alternately arranged over the regions A and B of the second dielectric layer 71b, neighboring the first dielectric layer 71a. However, the first and second internal electrodes of the region A have larger areas than the first and second internal electrodes of the region B, and have different patterns. That is, like the pattern shown in FIG. 6, each of the first and second internal electrodes 72a and 73a of the region A is provided at one side thereof with two lead-out portions 72'a and 73'a and one recess 72"a or 73"a, which are alternately disposed, and at the other side thereof with one lead-out portion 72'a or 73'a and two recesses 72"a and 73"a, which are alternately disposed. On the other hand, each of the first and second internal electrodes 72b and 73b of the region B is provided at one side thereof with one lead-out portion 72'b or 73'b and one recess 72"b or 73"b, which are alternately disposed, and at the other side thereof with one lead-out portion 72'b or 73'b and one recess 72"b or 73"b, which are alternately disposed.

In the first and second internal electrodes 72a and 72b, and 73a and 73b of the regions A and B, first and second conductive via holes 74a, 74b and 75 are formed through the lead-out portions 72'a, 72'b, 73'a and 73'b, to connect the set of internal electrode 72a, 72b, 73a or 73b having one polarity to each other.

As such, one capacitor part includes the first and second internal electrodes 72a and 73a formed at the region A of each of the first and second dielectric layers 71a and 71b, and the other capacitor part includes the first and second internal electrodes 72b and 73b formed at the region B of each of the first and second dielectric layers 71a and 71b. Moreover, the capacitor part of the region A has a larger electrode area than the capacitor part of the region B, and has a higher capacitance value.

In this way, the MLCC array of the present invention may have two or more capacitor parts having different capacitance values.

As described hereinbefore, the present invention provides an MLCC and an MLCC array. The MLCC of the present invention has desirably low ESL properties, by forming the first and second internal electrodes to be spaced apart from each other on the same dielectric layer while overlapping with other first and second internal electrodes on the neighboring dielectric layers, and connecting the first and second internal electrodes to the external terminals provided on the top surface or the bottom surface of the capacitor body through conductive via holes formed in the capacitor body in a stacking direction of the capacitor body. Moreover, the MLCC of the present invention can be effectively applied to the MLCC array having low ESL properties.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A multilayered chip capacitor, comprising:
   a capacitor body formed by stacking a plurality of dielectric layers;
   pluralities of first and second internal electrodes formed on each of the dielectric layers;
   at least one first external terminal and at least one second external terminal formed on at least one of a top surface and a bottom surface of the capacitor body; and
   at least one first conductive via hole and at least one second conductive via hole formed in the capacitor body in a stacking direction of the capacitor body to be connected to the first and second external terminals,
   wherein the first and second internal electrodes formed on the same dielectric layer are spaced apart from each other, and the first and second internal electrodes formed on the stacked dielectric layers overlap with each other with one dielectric layer interposed therebetween, each of the first and second internal electrodes having at least one lead-out portion at positions where the first and second internal electrodes overlap with other first and second internal electrodes formed on a vertically adjacent dielectric layer,
   the at least one first conductive via hole is formed through the lead-out portions of the first internal electrodes while being electrically insulated from the second internal electrodes, and
   the at least one second conductive via hole is formed through the lead-out portions of the second internal electrodes while being electrically insulated from the first internal electrodes.

2. The multilayered chip capacitor as set forth in claim 1, wherein each of the dielectric layers includes one first internal electrode and one second internal electrode thereon, and
   the at least one lead-out portion of each of the first and second internal electrodes protrudes toward the adjacent second and first internal electrodes on the same dielectric layer, and each of the first and second internal electrodes has a recess, which allows the first and second internal electrodes to be spaced apart from the adjacent second and first internal electrodes on the same dielectric layer.

3. The multilayered chip capacitor as set forth in claim 1, wherein each of the dielectric layers has a plurality of first internal electrodes or a plurality of second internal electrodes, or a plurality of first internal electrodes and a plurality of second internal electrodes thereon, and the first and second internal electrodes are alternately disposed on the same dielectric layer.

4. The multilayered chip capacitor as set forth in claim 3, wherein the pluralities of first and second internal electrodes are alternately disposed in one direction.

5. The multilayered chip capacitor as set forth in claim 4, wherein the at least one lead-out portion is formed at at least one side of the first and second internal electrodes, and each of the first and second internal electrodes has at least one recess at the other side thereof opposite the at least one lead-out portion thereof.

6. The multilayered chip capacitor as set forth in claim 4, wherein the first and second internal electrodes formed on the same dielectric layer have the same pattern shape.

7. The multilayered chip capacitor as set forth in claim 4, wherein each of the first and second internal electrodes has at least one lead-out portion and at least one recess at a side thereof opposite the adjacent second and first internal electrodes on the same dielectric layer.

8. The multilayered chip capacitor as set forth in claim 7, wherein the at least one lead-out portion and the at least one recess formed at the side of each of the first and second internal electrodes are alternately disposed.

9. A multilayered chip capacitor array, comprising:
a capacitor body formed by stacking a plurality of dielectric layers, and a plurality of capacitor parts formed at a plurality of divided regions on each of the dielectric layers,
wherein each of the capacitor parts includes pluralities of first and second internal electrodes formed on one region of each of the dielectric layers, at least one first external terminal and at least one second external terminal formed on at least one of a top surface and a bottom surface of the capacitor body, and at least one first conductive via hole and at least one second conductive via hole formed in the capacitor body in a stacking direction of the capacitor body to be connected to the first and second external terminals,
the first and second internal electrodes formed on the same dielectric layer are spaced apart from each other, and the first and second internal electrodes formed on the stacked dielectric layers overlap with each other with one dielectric layer interposed therebetween, each of the first and second internal electrodes having at least one lead-out portion at positions where the first and second internal electrodes overlap with other first and second internal electrodes formed on a vertically adjacent dielectric layer, and the at least one first conductive via hole is formed through the lead-out portions of the first internal electrodes while being electrically insulated from the second internal electrodes, and the at least one second conductive via hole is formed through the lead-out portions of the second internal electrodes while being electrically insulated from the first internal electrodes.

10. The multilayered chip capacitor array as set forth in claim 9, wherein at least one of the plurality of capacitor parts includes one first internal electrode and one second internal electrode formed on each of the dielectric layers, the at least one lead-out portion of each of the first and second internal electrodes protruding toward the adjacent second and first internal electrodes on the same dielectric layer, and each of the first and second internal electrodes has a recess, which allows the first and second internal electrodes to be spaced apart from the adjacent second and first internal electrodes on the same dielectric layer.

11. The multilayered chip capacitor array as set forth in claim 9, wherein at least one of the plurality of capacitor parts includes the plurality of dielectric layers, each of which has a plurality of first internal electrodes or a plurality of second internal electrodes, or a plurality of first internal electrodes and a plurality of second internal electrodes thereon, in which the first and second internal electrodes are alternately disposed on the same dielectric layer.

12. The MLCC array as set forth in claim 11, wherein at least one of the plurality of capacitor parts includes the pluralities of first and second internal electrodes alternately disposed in one direction.

13. The multilayered chip capacitor array as set forth in claim 12, wherein each of the plurality of capacitor parts includes the first and second internal electrodes arranged in the same direction.

14. The multilayered chip capacitor array as set forth in claim 12, wherein at least one of the plurality of capacitor parts includes the first and second internal electrodes, each of which has at least one lead-out portion formed at at least one side thereof, and at least one recess at the other side thereof opposite the at least one lead-out portion.

15. The multilayered chip capacitor array as set forth in claim 12, wherein at least one of the plurality of capacitor parts includes the same pattern shape of the first and second internal electrodes formed on the same dielectric layer.

16. The multilayered chip capacitor array as set forth in claim 12, wherein at least one of the plurality of capacitor parts includes the first and second internal electrodes, each of which has at least one lead-out portion and at least one recess at a side thereof opposite the adjacent second and first internal electrodes on the same dielectric layer.

17. The multilayered chip capacitor array as set forth in claim 16, wherein the at least one lead-out portion and the at least one recess formed at the side of each of the first and second internal electrodes are alternately disposed.

* * * * *